United States Patent Office 3,035,918
Patented May 22, 1962

3,035,918
PROCESS FOR TREATING FOOD
Harold A. Sorgenti and Herman Nack, Columbus, and George F. Sachsel, Worthington, Ohio, assignors, by mesne assignments, to The Battalle Development Corporation, Columbus, Ohio, a corporation of Delaware
No Drawing. Filed June 1, 1959, Ser. No. 817,091
7 Claims. (Cl. 99—1)

This invention relates to a process for treating food by immersing it in a fluidized bed of solid, discrete particles. More specifically, by this process food is partially or totally cooked, or cooled until frozen, by immersion in a fluidized bed, wherein said bed is at the appropriate temperature. Certain food products resulting from this process of food treatment are also new and novel.

Many processes presently exist for cooking food products. These processes are based on cooking in a liquid, or cooking in a gas. The two liquids most commonly used for cooking foods are water and oil or molten fat. Cooking in water has the disadvantage that the item being cooked picks up water, and consequently dehydration is not possible. In addition, the maximum cooking temperature that can be achieved is relatively low. Cooking in oil or molten fat permits higher cooking temperatures than water, but has the disadvantage that the food being cooked picks up and retains large quantities of the oil or fat. This retained fat or oil affects and masks the flavor of the food. The caloric value of the food is also altered. Foods containing substantial amounts of retained cooking fat or oil cause digestive disorders in many people. The shelf and storage life of foods cooked in fat or oil is limited and determined by the time it takes for the retained oil or fat to become rancid.

Many foods are prepared by cooking in a heated gas. The gas most commonly used is air plus any combustion gases that may be present. Unfortunately, air has a low coefficient of convection, necessitating relatively long cooking times.

It is an object of this invention to provide a food-treating process wherein the food is treated in a fluidized bed.

It is an object of this invention to provide a food-treating process utilizing heat transfer between a solid and a fluidized bed.

It is a further object of this invention to cook foods by immersing them in a fluidized bed of hot solid, discrete particles.

Another object of this invention is to cool and freeze food by immersing it in a fluidized bed of cool, solid, discrete particles.

It is a foremost object of this invention to provide a fast, greaseless cooking method.

It is another object of this invention to provide new potato products that are greaseless and which contain fewer calories than the raw potato.

Another object of this invention is to provide a new cooked nut product.

The above objects are achieved by the present invention by immersing food in a fluidized bed of solid, discrete particles and treating the food in the fluidized bed. If the bed particles are cold, then cooling of the food occurs; if the bed particles are hot, then heating of the food takes place. The bed particles may be used for flavoring, seasoning, and as a coating material. Because of this radically different method of treating food, new food products result.

In this process a bed of solid, discrete particles is subjected to an upward gaseous current, the size and weight of the particles and the velocity and nature of the current being so chosen that the force exerted by the current is sufficient to counterbalance the gravitational force on free particles and to expand the bed, thus allowing movement of the particles, but is insufficient to convert the bed into a stream of particles. A bed of solid, discrete particles subjected to and expanded by such an upward gaseous current in the manner described is hereinafter referred to as a fluidized bed.

A fluidized bed is a very effective heat-transfer system to a foreign material. Much greater rates of heat transfer are achievable by combining a solid and a gas to transfer heat than when a gas alone is used. This is due to the lower coefficient of convection for a gas. Because of the greater efficiency, much greater rates of heat transfer are achievable and good uniformity of heating is obtainable.

The treatment of foods in a fluidized bed presents a unique situation. For example, in the disclosure of the use of a fluidized bed for the drying of fabrics, it is reported that the bed material seems to adhere to the fabric and must be removed by vibrating the fabric after it leaves the bed. It can be seen that this would be a very undesirable result in the case of food treatment. The adherence of the bed material to the food must either be eliminated or controlled, if a tasty product is to be obtained. In addition, a process for the drying of fabrics is merely concerned with the removal of water from the material. Cooking frequently brings about a chemical change in the food and thus cooking is as sensitive as a chemical reaction.

A physical characteristic of a fluidized bed is that it resembles a liquid. An object may be immersed in a fluidized bed of solid, discrete particles in the same manner that it may be immersed in a liquid. In addition, an object may be passed through a fluidized bed, just as it may be passed through a liquid. Thus, the food to be treated is immersed in the fluidized bed at the appropriate temperature. It is allowed to remain there until the treatment is finished. The food is then removed from the bed.

The process of this invention may be readily used to either add to or remove heat from the food depending merely upon whether the fluidized bed is hot or cold. However, to simplify the discussion, adding of heat to the food will be discussed in sufficient detail to convey the over-all concept of the invention.

Since a food product is involved, that portion of the fluidized bed wherein the food is immersed must be constructed of a material suitable for food preparation, such as aluminum or stainless steel. The bed material is selected because of its ability to be fluidized, its stability at the temperature at which the bed is to be operated, and its safeness from a health standpoint. There are several materials that meet these requirements. Among those that have been tried and found successful are sodium chloride, triclacium phosphate, limestone, limestone-salt mixtures, and monosodium glutamate. Where the bed is to be operated at a relatively low temperature, certain foodstuffs such as sugar, rice, beans, and lentils may make suitable bed materials. The bed can be operated over a wide temperature range when nontoxic, inorganic, solid, discrete particles are used as the bed material. It is preferable that the bed material not adhere to the food. Of course, adherence of the bed material to the food may be a desirable circumstance where the bed material is to provide seasoning or flavoring to the foods or is to provide a coating. If a bed material is a particularly desirable one to use, but it adheres to the food, and this is undesirable, this aspect can be overcome by coating the food with a material that the bed material will not adhere to before immersing the food in the bed. A specific example of this procedure will be described in detail when the cooking of potatoes is discussed.

The temperature of the bed is dictated by the food to be cooked and the cooking time desired. There are many methods for raising or lowering the bed temperature. One method by which the bed temperature may be regulated is by heating the gaseous current passed through the bed. The bed particles are raised to the temperature of the gas stream. Cooling of the bed may also be accomplished in many ways. Refrigerating the gaseous current before passing it through the bed is one method.

Food taste and flavor could probably be varied by fluidizing the bed with gases other than air. Pure oxygen is one possibility. Flavor could also be varied by entraining or mixing flavoring agents in the gaseous current used to fluidize the bed. For example, smoke could be readily mixed with the fluidizing gaseous current. Smoked foods and foods with a smoky flavor are very much in demand.

In a production-type setup, the food to be treated in the fluidized bed could be suspended in the bed by means of wire baskets. This could be done on a continuous basis. Still another possibility would be the use of a moving screen-type conveyor through the bed. The speed of the baskets or the conveyor could be regulated to provide the proper exposure time in the bed.

The process of this invention is especially useful and valuable as a substitute for the preparation of food by the method of deep-fat frying. Foods prepared by the deep-fat frying process pick up large quantities of the fat during the preparation. Because of the large amounts of fat retained by foods prepared in this manner they have unique characteristics as food products. For example, such properties as taste, digestibility, and caloric value are affected. By the process of this invention, no oil or fat is present in the cooking step and any fat given off by the food during cooking reduces the caloric value of the cooked article. Thus, by this process new food products with unique tastes and flavors and with a lower calorie content can be prepared. Specific examples of new products resulting from this process are nuts and sliced potatoes cooked in a fluidized bed. No cooking fat is picked up by the nuts or potatoes because none is present.

Foods prepared by this process include meats, poultry, fish, nuts, vegetables, and coffee. Especially suited for cooking by this process are potatoes, nuts, parched sweet corn, shrimp, onion rings, and coffee.

The cooking of potatoes by the process of this invention yields a unique and especially tasty product. A fat- and oil-free potato chip and "French fried" potato have been prepared. The potato chip product resulting from the process of this invention contains considerably fewer calories than presently available potato chips prepared by deep-fat frying. Fat comprises one-third to one-half parts by weight of a potato chip prepared by deep-fat cooking. This retained fat increases the calorie content of the potato chip and also controls and masks the taste and flavor.

If it is desirable or necessary to coat the food to be treated in the fluidized bed to prevent or reduce adherence of a particular bed material to the food, the food may be coated with an inert nontoxic material to which the bed particles will not adhere before immersing the food in the cooking bed. The coating material can be applied to the food by tumbling or by means of a fluidized bed separate from the cooking bed. The coating material can be fluidized in a bed and the food immersed in the bed.

The food to be treated can be flavored either by adding flavoring material to the coating agent, the gaseous fluidizing current, the cooking bed, or by adding the flavoring materials to the food after it is removed from the cooking bed. For special effects two or more bed materials may be mixed together. Thus, the same fluidized bed could simultaneously be used for cooking, flavoring, and adding of a preservative to the food.

Since the cooking of potato slices, commonly called potato chips, exemplifies the process of this invention, the preparation of this food product will be discussed in detail. The first step in the preparation of the potato chip product in the slicing of the raw potato. Insofar as possible, uniformity of thickness of the slices of each batch is maintained. In cooking potato chips, there is frequently a formation of bubbles on the chip. This bubble formation can be eliminated or minimized by making a plurality of punctures in the raw potato slices. When the potato slices are cooked, the exterior surface becomes moist. Most fluidized bed materials will adhere to this moist surface. When the potato slices were cooked in a fluidized bed of sodium chloride, adherence and retention of sodium chloride occurred in various degrees. Thus, it was possible to salt the potato chips in the cooking step. Pickup of the bed material by the potato product can be controlled by (1) selection of the bed material and (2) by coating the potato slices before cooking. Tricalcium phosphate is the only fluidized bed material that was tried that did not adhere in some degree to the potato slice during cooking. Cooking in a combined bed of tricalcium phosphate and sodium chloride would also result in a salted, cooked product, with a smaller salt pickup by the product. To cook potato chips in a fluidized bed of sodium chloride particles without pickup and retention of sodium chloride by the potato slices, it is necessary to coat the potato slices with an inert, nontoxic material to which the salt does not adhere. Preferably, the coating should not adversely affect the taste, color, or cooking characteristics of the potato slices. Coating materials used for preparing potato chips included potato flour, flour, baking powder, monosodium glutamate, potato flour suspensions, and monosodium glutamate solution. Dry potato flour was extremely satisfactory for reducing the salt pickup during cooking without leaving a taste, film, or color change. The potato slices may be effectively coated with potato flour by immersing the slices in a fluidized bed of the flour. Of course, other methods of coating the potato slices with potato flour may also be used. For example, the slices may be tumbled in potato flour.

When the potato slices have been coated, they are next immersed in a fluidized bed of sodium chloride particles. A satisfactory product results in a reasonable time when the bed is maintained at a temperature of not less than 250° F. and not more than 550° F. The most tasty product is obtained when the bed temperature is not less than 300° F. and not more than 400° F. A stream of heated air is used to fluidize the bed and to maintain it at the proper temperature. Good temperature control and uniform heating of the food product is attainable in the fluidized bed method of cooking. When the potato chip has cooked to the desired degree, it is removed from the fluidized bed. An attractive potato chip, with a brown color, and with a unique pleasing taste results from this process. Since no fat or oil is picked up by the potato in the cooking process, and, in fact, starch is given off and lost by the potato during its preparation, a new fat-free potato chip product results that has a substantially lower calorie content than presently available products.

The principles applicable to the preparation of a potato chip product by this process are also applicable to the preparation of a "French fried"-type potato product. A "French fried"-type potato product as the term is used herein results when a potato is cut into the shape of a French fried potato, but is cooked in a fluidized bed so that the cooked potato is free from cooking fat and grease. In general, these principles are also applicable to the preparation of other food products.

If it is desired to prepare a frozen food product, it merely would be necessary to cool the fluidized bed instead of heating it.

The following examples are intended to more clearly define and illustrate the process and products of this invention.

EXAMPLE 1

Raw potatoes were scrubbed and washed to remove dirt and a portion of the peel. The potatoes were sliced into three different thicknesses, using a conventional potato slicer. In one batch the slicer was set to obtain 34 slices per inch, in another 25 slices per inch, and in a third 17 slices per inch. No noticeable change in the finished product in texture, color, or bubble formation occurred because of variation in the thickness of the slice cooked. Cooking time is, of course, dependent on the thickness of the slice, the thicker slice requiring a longer time.

Potato slices of approximately uniform thickness were tumbled with potato flour so as to obtain a coating of the flour on the slice. The coated slices were then transferred to a wire basket. This basket was immersed in a fluidized bed of sodium chloride particles. The temperature of the fluidized bed was regulated at 330° F. Temperature control was achieved by heating the air circulated through the bed. The potatoes were removed from the fluidized bed when cooked. When potatoes sliced to a thickness of 25 slices per inch were used, cooking time at a temperature of 330°F. was less than 3 minutes. A taste panel gave this product a very favorable rating.

EXAMPLE 2

The procedure of Example 1 was repeated with the exception that the bed was maintained at a temperature of 475° F. Cooking time at this temperature was about 45 seconds, for potatoes sliced to a thickness of 25 slices per inch.

EXAMPLE 3

Potatoes were sliced to a thickness of 25 slices per inch. The potato slices were then coated with potato flour and immersed in a fluidized bed of sodium chloride. The temperature of the cooking bed was 330° F. A crisp, evenly browned product was obtained after a cooking time of 165 seconds.

EXAMPLE 4

Potatoes were sliced to a thickness of 25 slices per inch and coated with potato flour. The effect of temperature on the quality of the potato chip product and cooking time was investigated. The following table summarizes the results of these tests:

*Table 1.—Effect of Temperature on Product Quality and Cooking Time*

| Temperature, ° F. | Cooking Time, Seconds | Quality |
|---|---|---|
| 550 | 35 | Dark brown in spots—light elsewhere; saltiness low; crisp. |
| 475 | 45 | Do. |
| 400 | 85 | Do. |
| 330 | 165 | Evenly browned; saltiness low; crisp. |
| 275 | 240 | Very lightly browned; crisp; saltiness low. |

EXAMPLE 5

Raw potatoes were sliced to a thickness of 25 slices per inch. The potato slices were placed in a wire basket and immersed in a fluidized bed of tricalcium phosphate. The potato slices were not coated before cooking. The temperature of the fluidized bed was regulated at about 350° F. A potato chip with good appearance and taste was obtained after a cooking time of about 4 minutes. The fluidized bed material, tricalcium phosphate, did not adhere to the potato slices.

EXAMPLE 6

Raw potatoes were cut into the shape of French fried potatoes (3 x ⅜ x ⅜ inches). They were then immersed in a fluidized bed of sodium chloride. The bed was maintained at a temperature of 330° F. The potatoes were completely cooked in 8 minutes and were evenly browned, crisp, and tasty.

EXAMPLE 7

Potatoes cut into the shape of French fried potatoes (3 x ⅜ x ⅜ inches) were coated with potato flour and immersed in a fluidized bed of sodium chloride. The temperature of the fluidized bed was 330° F. Sodium chloride pickup and retention by the potato strips during the cooking step was negligible. The potato strips were completely cooked in about 8 minutes.

EXAMPLE 9

Potatoes cut into the shape of French fried potatoes (3 x ⅜ x ⅜ inches) were coated with potato flour and immersed in a fluidized bed of sodium chloride. The temperature of the fluidized bed was 330° F. The potatoes were removed from the fluidized bed after a cooking time of 4 minutes. At this time, the potato was in a partially cooked state. The partially cooked potatoes were then immersed in a fluidized bed of sodium chloride maintained at a temperature of 0° F. or lower. When frozen, the potatoes were removed and stored for a one-week period. The potatoes were then removed from frozen storage, thawed, and the balance of the cooking was performed in an oven for a period of about 15 minutes.

EXAMPLE 10

Green cashew nuts were cooked in a fluidized bed of sodium chloride. The temperature of the bed was 330° F. The nuts were completely cooked in about three minutes, were evenly browned, and had excellent taste and flavor, with little or no salt pickup.

Presently, cashew nuts are cooked commercially by deep-fat frying at 450° F. The storage period of cashew nuts that have been deep-fat fried is limited since the fat picked up in the cooking process becomes rancid. Nuts cooked in a fluidized bed give off fat contained in the nut during the cooking process. Thus, the result is a cooked nut product that has a lower caloric value than the raw nut.

EXAMPLE 11

Onion rings were cooked in a fluidized bed of sodium chloride. The bed temperature was approximately 350° F. The onion rings were removed from the fluidized bed when cooked.

EXAMPLE 12

Onion rings were cooked in a fluidized bed of tricalcium phosphate. The fluidized bed was maintained at a temperature of approximately 350° F. The onion rings were removed from the bed when cooked.

EXAMPLE 13

Breaded shrimp were cooked in a fluidized bed of sodium chloride at a temperature of 350° F. The shrimp were completely cooked in two to three minutes. The shrimp prepared in this manner were tasty and the breading had a definite salt taste.

EXAMPLE 14

Shelled, raw, unbreaded, green shrimp were cooked in a fluidized bed of sodium chloride at a temperature of about 350° F. After cooking, the shrimp were eaten.

EXAMPLE 15

Frankfurters were cooked in a fluidized bed of sodium chloride. The temperature of the bed was approximately 180° F.

EXAMPLE 16

Frankfurter emulsion in a casing was cooked in a fluidized bed of sodium chloride. The cooking temperature was approximately 180° F. At this temperature the frankfurters were cooked throughout in 6 minutes.

EXAMPLE 17

Coffee can be roasted by the fluidized bed process of this invention.

It can be seen from the above examples that the food-preparation process of this invention is one of broad application and can be used to treat many foods. An exhaustive listing of all the foods that can be treated by this process has not been attempted. All foods susceptible to treatment by this process are intended to be included within the scope of the appended claims.

What is claimed is:

1. A method for processing food products comprising the steps of: immersing a food to be processed in a fluidized bed of nontoxic solid discrete particles wherein the food is brought into direct contact with the particles of the bed to process said food, and then removing the processed food from the fluidized bed.

2. A process for cooking food products comprising the steps of: coating a food with a nontoxic material; immersing the coated food to be cooked in a fluidized bed of nontoxic solid discrete particles wherein the coated food is brought into direct contact with the particles of the bed to cook said food; and then removing the cooked food from the fluidized bed.

3. A process for cooking food products comprising the steps of: immersing the food to be cooked in a fluidized bed of hot, nontoxic solid, discrete particles wherein the food is brought into direct contact with the particles of the bed to cook said food, and then removing the cooked food from the fluidized bed.

4. A process for freezing food products comprising the steps of: immersing the food to be frozen in a fluidized bed of cold, nontoxic solid, discrete particles wherein the food is brought into direct contact with the particles of the bed to freeze said food, and then removing the frozen food from the fluidized bed.

5. A process for preparing a cooked potato product comprising the steps of: immersing the potato to be cooked in a fluidized bed of hot, nontoxic solid, discrete particles wherein the potato is brought into direct contact with the particles of the bed to cook said potato and removing the cooked potato from the bed.

6. A process for preparing a cooked potato product comprising the steps of: cutting the potato into pieces having appropriate shapes; coating the potato pieces with a nontoxic material; immersing the coated potato pieces in a fluidized bed of hot, nontoxic solid, discrete particles wherein the potato pieces are brought into direct contact with the particles of the bed to cook said potato pieces; and removing the cooked pieces from the bed.

7. A process for preparing a cooked potato product comprising the steps of: cutting the potato into pieces having appropriate shapes; coating the potato pieces with a finely-divided potato material; immersing the coated potato pieces in a fluidized bed of solid, discrete sodium chloride particles wherein the coated potato pieces are in direct contact with the particles of the bed to cook said potato pieces, said bed being maintained at a temperature of 250° to 550° F., and removing the cooked potato pieces from the bed after 35 to 240 seconds.

References Cited in the file of this patent

UNITED STATES PATENTS

| | | |
|---|---|---|
| 1,199,124 | Snelling | Sept. 26, 1916 |
| 2,705,679 | Griffiths et al. | Apr. 5, 1955 |
| 2,716,608 | Renish | Aug. 30, 1955 |
| 2,771,370 | Allen | Nov. 20, 1956 |
| 2,813,029 | Shirk | Nov. 12, 1957 |
| 2,818,049 | Blaskowski et al. | Dec. 31, 1957 |
| 2,835,483 | Lindsay | May 20, 1958 |
| 2,836,496 | Salvo | May 27, 1958 |
| 2,859,116 | Heimbs et al. | Nov. 4, 1958 |
| 2,884,373 | Bailey | Apr. 28, 1959 |

FOREIGN PATENTS

| | | |
|---|---|---|
| 564,925 | Canada | Oct. 21, 1958 |

Disclaimer 3,035,918.—*Harold A. Sorgenti* and *Herman Nack*, Columbus, and *George F. Sachsel*, Worthington, Ohio. PROCESS FOR TREATING FOOD. Patent dated May 22, 1962. Disclaimer filed Oct. 23, 1963, by the assignee, *The Battelle Development Corporation*.

Hereby enters this disclaimer to claims 1 and 4 of said patent.
[*Official Gazette December 31, 1963.*]

Dedication 3,035,918.—*Harold A. Sorgenti* and *Herman Nack*, Columbus, and *George F. Sachsel*, Worthington, Ohio. PROCESS FOR TREATING FOOD. Patent dated May 22, 1962. Dedication filed Aug. 2, 1974, by the assignee, *The Battelle Development Corporation*.

Hereby dedicates to the People of the United States the entire remaining term of said patent.

[*Official Gazette December 24, 1974.*]